Patented Apr. 12, 1949

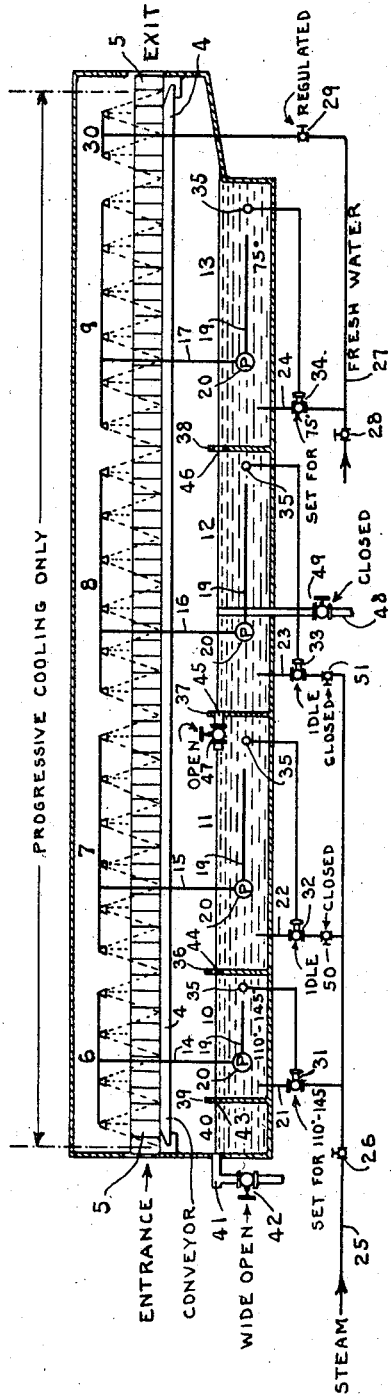
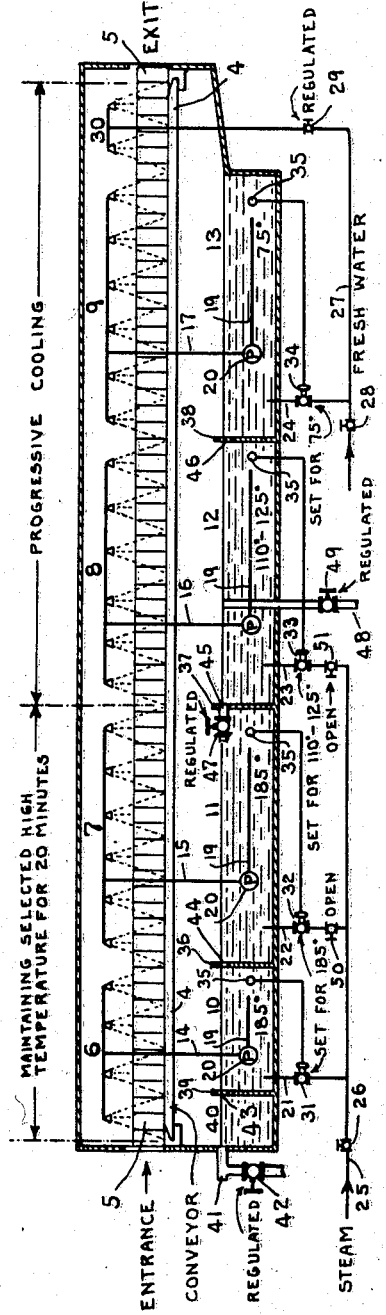

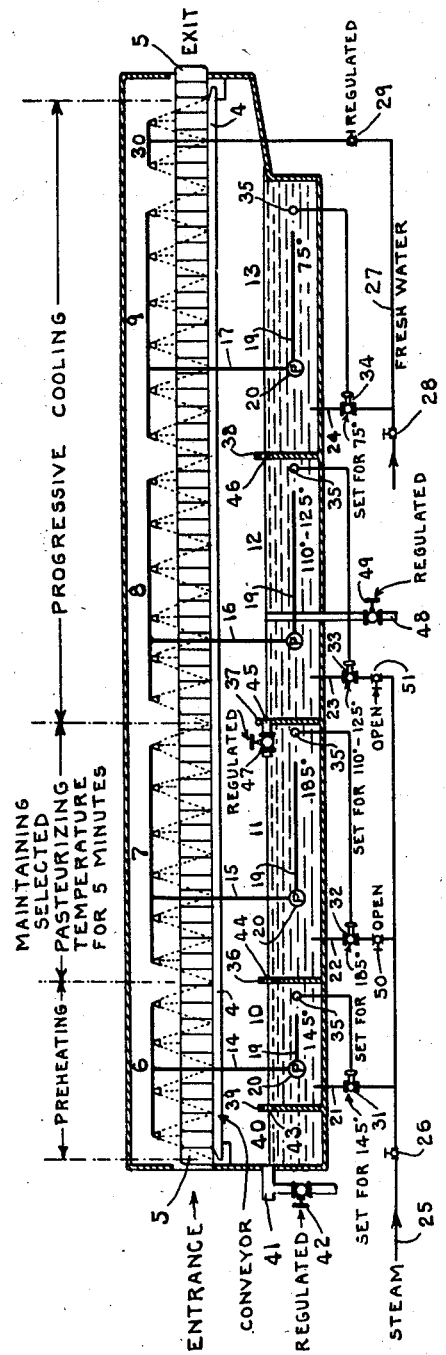

2,466,769

UNITED STATES PATENT OFFICE 2,466,769

APPARATUS FOR VARYING THE TEMPERATURES OF TRAVELING CONTAINERS

James L. Herold, St. Louis, William J. Nekola, Normandy, and Frederick W. Wehmiller, Ladue, Mo., assignors to Barry-Wehmiller Machinery Company, St. Louis, Mo., a corporation of Missouri Application May 2, 1947, Serial No. 745,674

4 Claims. (Cl. 257—3)

This invention relates to apparatus for varying the temperatures of traveling containers, and more particularly to novel conditions wherein showers or sprays of liquids at selected temperatures are discharged onto traveling containers to heat or cool the containers and their contents.

One of the objects of the invention is to produce a single system having novel cooperative details which enable it to very efficiently and economically perform substantially different processes of cooling, heating and pasteurizing.

Prior to this invention, there has been an outstanding demand for a commercially feasible single unit adapted to comply with all of the special cooperative requirements involved in various different heating and cooling processes. For example, one type of process may be limited to very gradual controlled cooling of hot containers and their contents. Another process may require the containers to be maintained at a predetermined high temperature for a selected period of time and then gradually cooled. In a third process, the containers may be gradually preheated to a selected pasteurizing temperature, and maintained at that temperature for a predetermined period and then subjected to a gradual cooling at progressively decreasing temperatures. In actual practice, it would be quite desirable to employ a single machine for various different processes of this kind, especially in a plant where different types of products are to be treated at different periods, or during different seasons of the year. As a specific illustration, we will hereafter refer to radically different treatments desired at different seasons in a plant where fruit products are packed in containers, but of course the invention is not limited to products of this type, nor to the specific temperatures herein given.

A primary object of the invention is to create an entirely feasible system whereby a single machine, occupying a comparatively small floor space, can be employed to very efficiently and economically perform all of the functions heretofore performed by a plurality of specially designed machines, or by rather cumbersome and less efficient procedures. A specific object is to provide for high efficiency and economy at each stage of the variable heating and cooling operations, including economy in the use of hot and cold temperature-regulating fluids, positive control in selecting the desired temperatures in radically different zones, and convenience in handling the containers, while insuring the predetermined result in each of the several different processes.

With the foregoing and other objects in view, the invention comprises the specific combination and arrangement of details herein shown and described to set forth the principles involved in the new procedure. However, it is to be understood that the invention extends to variations and modifications within the scope of terms employed in the claims hereunto appended.

Fig. 1 is a diagrammatical view of a system adapted for use in carrying out the invention, showing an arrangement of conditions desired in a process of gradually cooling traveling containers and their contents.

Fig. 2 is a similar diagram of the same system, showing substantially different critical conditions involved in maintaining the incoming traveling containers and their contents at a relatively high temperature for a selected prolonged period, and then gradually cooling the same to a selected low temperature.

Fig. 3 is another diagram of the same system set for still different conditions involved in a process of gradually preheating the containers from a relatively low temperature to a predetermined pasteurizing temperature, then maintaining the pasteurizing temperature for a predetermined period of time, and thereafter gradually cooling the hot containers to a selected low temperature.

To illustrate a desirable form of the invention, we will specifically describe different arrangements of conditions which are commercially desirable in processes of treating different kinds of fruit products. However, it is to be understood that the invention is not limited to the details of these arrangements, except as specified in the claims. For convenience in this description we will refer to specific temperatures at various points in the system, but all of these are merely suggestions for average temperatures. In actual practice, the containers do not enter the system at an exactly uniform temperature, and it is not necessary to maintain an absolutely uniform temperature at any given point. However, the variable system can be set to avoid undue variations from the temperature selected for any given point.

The apparatus herein shown comprises a conveyor 4 arranged in a suitable housing to receive containers 5 at an intake end of the system and discharge them at the opposite end. In actual practice for a commercial apparatus, we have employed a conveyor of the type shown in Patent No. 2,275,433, granted March 10, 1942, for an invention of J. L. Herold, W. J. Nekola and F. W. Wehmiller. However, any other suitable type of conveyor may be employed.

The function of the conveyor is to transmit the containers through zones of carefully selected temperatures produced by liquids which are discharged onto the containers and then passed through the conveyor to pools of liquid below said conveyor.

More specifically stated, the apparatus may include groups of showering or spraying devices 6, 7, 8 and 9 above the conveyor to discharge liquids at selected temperatures onto the traveling containers, thereby forming successive temperature zones above the conveyor. A series of liquid compartments 10, 11, 12 and 13 is located below the conveyor 4 to receive liquids falling from the containers.

Liquid conductors 14, 15, 16 and 17 lead from the respective liquid compartments to the groups of showering devices above the conveyor, each of said liquid conductors having an inlet 19 at one of said compartments and outlets at a group of the showering devices above the compartment in which its inlet is located. Pumps 20 are located in the liquid conductors to force liquids from said compartments to the groups of showering devices.

These showering devices are preferably designed to discharge the liquids in the form of finely divided sprays which flare downwardly into relatively large areas at the traveling containers, so as to form continuous zones in the paths of the containers, the pumps 20 being operated to forcibly project said sprays onto the containers. In this manner, the containers are very effectively subjected to the temperatures of the forcible flaring sprays.

The system also includes means for introducing temperature-controlling fluids into the compartments 10, 11, 12 and 13, so as to provide a desired liquid temperature in each compartment. While the temperatures of the pools of liquids may be controlled in any suitable manner, advantages are gained by introducing regulated amounts of temperature-controlling fluids into said pools. For example, the liquid compartments may be provided with separate inlet conductors 21, 22, 23 and 24 for the admission of hot and cool fluids. The inlet conductors 21, 22 and 23 may be connected to a steam supply pipe 25 provided with a valve 26, while the inlet conductor 24 is connected to a pipe 27 through which relatively cool fresh water is admitted. The pipe 27 is provided with valves 28 and 29 and it may be extended to a supplemental group of spraying devices 30 above a discharge end portion of the conveyor, so as to discharge the coolest liquid onto the outgoing containers.

It is to be understood that the temperature-controlling fluids are employed to maintain selected temperature conditions in the several pools, and that the admission of such fluids may be regulated by hand-operated valves, or in any other suitable manner. However, to illustrate a very desirable procedure, we have diagrammatically shown thermostatic valves 31, 32, 33 and 34 in the inlet conductors 21, 22, 23 and 24, each of said thermostatic valves being equipped with a temperature-responsive controlling member 35 exposed to the temperature of the pool of liquid associated with its inlet conductor. Valve devices of this type can be set to maintain the pools at selected temperatures, the admission of heating or cooling fluid being automatically regulated to provide predetermined temperatures in the successive pools.

The several liquid-receiving compartments are separated from each other by means of partitions 36, 37 and 38, and there may be an additional partition 39 at one side of the compartment 10 to provide a trap 40 for excess products, or foreign matter, washed from the containers. This trap is provided with an overflow conductor 41 to discharge excess liquid, and a valve 42 in said conductor to regulate such discharge.

Attention is now directed to overflow passages 43, 44, 45 and 46 in the several partitions which allow liquid to overflow from one pool to another, in a direction opposite to the travel of the conveyor 4 and finally escape from the system at the valve-controlled overflow 41. It may be noted that the overflow 45 at the partition 37 is provided with a valve 47 which may be adjusted to carefully regulate this overflow, or to completely close the same. As a cooperative detail, the compartment 12 at the right of said partition 37 is provided with an overflow conductor 48 to discharge excess liquid from the system, and a valve 49 to regulate or prevent overflow through said conductor 48.

The system herein shown includes ordinary manually operated valves 50 and 51 in the inlet conductors 22 and 23 adapted to be entirely open when their companion thermostatic valves 32 and 33 are effective, or to be entirely closed when it is desired to eliminate the normal functions of these thermostatic valves.

*Process of gradually cooling containers and their contents*

One of the processes to be carried out in the treatment of containers for jams, jellies, preserves and other products, consists in gradually reducing the temperatures of the containers. In a process of this kind, the previously heated containers will enter the system at an approximately uniform temperature known to the operator, and various controlling devices will be set to progressively cool the traveling containers from this predetermined high temperature to a selected low temperature.

For example, in Fig. 1 we have shown special cooperative conditions which result in very high efficiency in a process limited to progressive cooling from a known high temperature to a selected low temperature. In this illustration (Fig. 1), the thermostatic valve 31 is set to maintain a predetermined temperature in the pool of liquid in compartment 10. More specifically stated, if the incoming containers are at an average temperature of 130° F., the pool in compartment 10 may be maintained at a temperature of about 110° F., or if the incoming containers are at an average temperature of 200° F., said pool may be maintained at a temperature of about 145° F. However, any other selected temperature range can be maintained in this pool, and consequently in the liquid discharged from a group of spraying devices 6 above said pool. The sprayed liquid will contact with the hotter containers and return by gravity at a temperature higher than that of the pool in compartment 10. This added heat obtained from the containers themselves provides substantial economy in the use of steam, or other heating fluid, from the thermostatic valve 31, at the same time providing for efficiency and economy in the zones of lower temperature, as will be hereinafter described.

In this illustration (Fig. 1), the thermostatic valve 34 is set to maintain a selected low temperature, for example 75° F., in the pool of compartment 13, and also in the cooling liquid discharged from the companion group of spraying devices 9 above this compartment. This cooling liquid may be fresh water derived from the supply pipe 27 and controlled by said thermostatic valve 34. For subsequent cooling, the fresh water may be transmitted directly to the supplemental group of spraying devices 30 as shown in Fig. 1, and regulated by adjustment of the hand-operated valve 29 in the supply pipe 27.

Attention is now directed to special intermediate cooperative conditions which appear in Fig. 1, between the first pool which is maintained at a predetermined high temperature in compartment 10 and the final pool which is maintained at a selected low temperature in compartment 13. For these intermediate stages, we have closed the valves 50 and 51 to positively prevent admission of steam to the compartments 11 and 12, thereby deliberately eliminating the functions of the thermostatic valves 32 and 33, and also avoiding the cost of such additional heating medium at the intermediate stages. To obtain this economy, and at the same time provide for the desired progressive cooling at the intermediate zones, the valve 49 in the overflow conductor 48 is closed, and the valve 47 in the overflow passage 45 is open.

As a consequence, we have created highly desirable cooperative conditions as follows:

The cool water from the groups of spraying devices 9 and 30 is heated by contact with the warmer containers before falling into the pool of compartment 13. This added heat tends to increase the temperature of the last mentioned pool. However, as compensating factors, the fresh cold water is admitted directly to the supplemental spraying devices 30, and the heated liquid from the pool in compartment 13 is constantly overflowing from the top of said pool to the next adjacent compartment 12, where a relatively high temperature is desired for a previous stage in the progressive cooling.

The temperature of the pool in this intermediate compartment 12 is determined partly by the overflow of excess heated liquid from the coolest compartment 13. However, an important factor in providing the desired temperature for said pool appears in the added heat derived from the warmer containers. Liquid from this pool at 12 is pumped to the group of spraying devices 8 and discharged onto the relatively hot containers, so as to heat the sprayed liquid before it returns to the pool. A desired degree of added heat for the pool in compartment 12 is thereby freely obtained from the traveling containers.

Of course, such additional heating has a tendency to unduly increase the temperature of the pool in the intermediate compartment 12. However, to avoid waste of heat from said pool and at the same time maintain a still higher temperature in the next adjacent compartment 11, the valve in the discharge conductor 48 may be closed, while the valve in the overflow passage 45 is opened to permit a continuous overflow of excess heated liquid to the compartment 11.

The pool in said compartment 11 receives additional heat from the warmer containers, due to the spraying of its liquid onto the containers and the return of this heated liquid. However, excess heated liquid from the top of said pool is constantly overflowing through passage 44 to the warmer pool in the compartment 10.

The hottest pool of liquid for this progressive cooling process is in the compartment 10, associated with the group of spraying devices 6. Liquid from this compartment is forcibly sprayed onto the hotter incoming traveling containers, and then returned to said compartment. However, excess heated liquid overflows from the top of the hot pool in this compartment 10 to the trap 40 and thence to the overflow conductor 41, and through the valve 42 which is open for free discharge of the overflowing liquid.

Study of the specific arrangement of cooperative details in Fig. 1 will show that our method of and apparatus for carrying out substantially different processes, in a single unitary system, has outstanding advantages in a process limited to special requirements for progressive gradual cooling.

A large mass of the hot containers can be crowded onto a simple, horizontal traveling conveyor which transmits them through successive temperature zones. The desired progressive decrease in temperature is safely and efficiently obtained from forcible sprays of liquids discharged onto the containers in the several zones. The costs of added hot and cool temperature-controlling fluids is relatively low, and this is especially true of the steam or other heating medium. The successive sprays of cooling liquids are heated by direct forcible contact with the crowded mass of traveling containers and then returned by gravity to selected pools, while excess heated liquid merely overflows from one pool to another in a direction opposite to the travel of the containers.

For this specific process of very gradually cooling the traveling containers, the valve in the intermediate discharge conductor 48 may be entirely closed to prevent loss of heated liquid, while the intermediate overflow passage 45 is entirely open to transfer such heated liquid to a compartment where a relatively high temperature is desired. As an additional control of the flexible system, the hand-operated valves 50 and 51 in the inlet conductors 22 and 23 are closed to eliminate the normal functions of their companion thermostatic valves, because the selected overflow conditions overcome the necessity of adding steam or other extraneous heating mediums at these intermediate zones.

However, to selectively perform substantially different processes in this simple system, the overflow conditions at the valves 47 and 49 can be reversed, or regulated for economy and efficiency in producing and maintaining the desired temperature zones. For similar reasons, one or both of the hand-operated valves 50 and 51 may be opened to provide for selected automatic control of heating fluid to the compartments 11 and 12.

*Process of maintaining high temperature and then gradually cooling the containers*

Fig. 2 illustrates substantially different cooperative conditions which may appear in a process of treating products to be maintained at a selected high temperature for a predetermined period, and then gradually cooled to a selected lower temperature. Various different products require treatments of this kind at different temperatures, and the system can be set to maintain any selected high temperature while providing the desired progressive cooling temperatures.

However, as a very specific example, Fig. 2 illustrates conditions which are desirable in maintaining prune juice at a selected average temperature of 180° F. for twenty minutes, and then gradually cooling the traveling containers to 100° F.

In this specific illustration, the hand-operated valves 50 and 51 are open, and they do not materially interfere with other regulations. The thermostatic valves 31 and 32 are set to maintain a temperature of 185° F. in the pools of the compartments 10 and 11, while the thermostatic valve 33 is set to maintain a lower temperature, between 110° F. and 125° F., in the pool of compartment 12, the thermostatic valve 34 being set for 75° F. in the cooling pool of compartment 13. At the left hand end of Fig. 2, the overflow valve 42 in the discharge conductor 41 is set for a restricted discharge which maintains a liquid level high enough to provide for overflow from one pool to another and thence to said discharge conductor 41. At an intermediate portion of the system, the overflow valve 47 is closed, or almost closed, to prevent excessive delivery of relatively cool liquid from the compartment 12 to the hotter compartment 11, while the valve 49 in the intermediate discharge conductor 48 is regulated for a discharge of excess heated liquid from the compartment 12.

Under these specific cooperative conditions, liquid from the compartments 10 and 11 in Fig. 2 will be pumped to the groups of spraying devices 6 and 7 at a temperature of 185°, and then discharged onto the traveling containers above said compartments, the sprayed liquid being allowed to drop by gravity from the containers to the lower compartments, from which excess heated liquid is permitted to overflow to the discharge conductor 41.

At the same time, relatively cool liquid is pumped from the compartment 12 and forced to the group of spraying devices 8 above said compartment. This sprayed liquid is heated by contact with the containers, and then allowed to fall into the same compartment, while excess heated liquid overflows through the discharge conductor 48. Under these conditions, wherein the containers themselves add heat to the pool in compartment 12, very little added heating fluid is required at the inlet conductor 23. In fact, the heat derived from the containers has a tendency to overheat the pool in the compartment 12, but this is compensated for by a constant overflow of relatively cool liquid from the next compartment 13. Liquid from this cool compartment 13 is constantly pumped to the group of spraying devices 9 above said compartment, so as to contact with the warmer containers and then return to the same compartment. Of course, this returning liquid adds heat from the containers to the pool in compartment 13. However, the coolest liquid is discharged directly from the supply pipe 27 to the supplemental group of spraying devices 30 at the right hand end of Fig. 2, and this relatively cool liquid passes from the outgoing containers to the pool in compartment 13, where it tends to prevent overheating of said pool. The delivery of said cooling liquid to the spraying devices 30 is regulated at the valve 29 for the desired final cooling of the containers.

In this process of maintaining the traveling products at a predetermined high temperature for a predetermined prolonged period, and then gradually cooling the same to a selected low temperature, the various cooperative details can be set to positively provide for high efficiency at each of the successive stages, while also economizing in the use of added heating and cooling fluids.

*Process of preheating, pasteurizing and then gradually cooling the traveling products*

In Fig. 3 we have shown the same system set for a process of preheating, pasteurizing and then gradually cooling the containers to a selected low temperature. In this specific example, we are assuming that grape juice in containers enters the system at an average temperature of 70° F., and that this product is to be preheated to a pasteurizing temperature of 180° F., and maintained at that high temperature for a period of five minutes, all of which is to be followed by progressive cooling to a temperature of 100° F. Other specific temperatures for a process of this kind can, of course, be selected and maintained to provide the successive conditions desired for the treatment of numerous different products.

To accomplish the specific results referred to in connection with Fig. 3, the hand-operated valves 50 and 51 are entirely open. The thermostatic valves 31, 32 and 33 which regulate the admission of steam, may be then set to maintain a temperature of 145° F. in pool of compartment 10, 185° F. in the compartment 11, and a range between 110° and 125° in the compartment 12. The admission of added cooling fluid through the thermostatic valve 34 may be regulated to provide a temperature of 75° F. in the pool of compartment 13, while the hand-operated valve 29 is adjusted to provide the desired cooling at the final group of spraying devices 30.

At an intermediate portion of the system, the overflow valve 47 may be closed, or almost closed, while the valve 49 in the discharge conductor 48 is in a regulated open position. At the left hand end of the system, the overflow valve 42 is selectively throttled to maintain liquid levels desired for overflows from one pool to another, and the desired discharge of excess liquid through the conductor 41.

When all of these cooperative conditions are created, we accomplish the specific results referred to in the example of Fig. 3, with selected overflows from one compartment to another in a direction opposite to the travel of the containers, so as to economize in the admission of added heating and cooling fluids, while providing the desired successive temperature zones in the forcible sprays of liquid above the traveling conveyor.

In each of these substantially different processes, the incoming containers can be very readily crowded onto one end of a wide, horizontal conveyor, so as to produce a more or less irregular crowded mass of containers, which merely travel in a simple horizontal course through the deliberately selected series of temperature zones. This provides for high capacity in handling an extremely large number of containers per hour, as well as economy and convenience in receiving and discharging the more or less irregular mass of crowded containers.

The several groups of forcible, flaring sprays provide for forcible intimate contacts of heating and cooling liquids at surfaces of all of the containers in the several zones, so as to efficiently subject each container to the temperature of the zone in which it is located.

The several pumps 20 may be constantly operated for continuous showering of liquid at selected temperatures in the successive zones, and such pumps are conveniently regulated for the desired rate of flow in each zone. However, the admission of expensive heating and cooling fluids from the inlet conductor 21, 22, 23 and 24 to the several pools may be rather intermittent, as our system can be regulated to depend largely upon heat derived from the traveling containers themselves, and overflows from one compartment to another under selected conditions, which tend to provide the desired temperature variations in adjacent spraying zones. These selective conditions result in an outstanding economy in the use of added heating medium for each of the several different kinds of processes to be performed in our simple flexible system.

The admission of added heating fluid is most conveniently regulated by thermostatic valves, but it could be regulated by hand-operated valves in carrying out our novel process, or the regulated added heat could be from submerged heating coils, or electrical heating in some variations of the process. However, we prefer the variable cooperative arrangement as herein disclosed, with manually controlled valves for one or more intermediate zones, such as we have shown at 50 and 51, to eliminate the admission of heating fluid through a selected thermostatic valve. The valve 29 for the supplemental group of cooling sprays 30 is preferably regulated by hand to provide a desired temperature at the discharged containers, and at the same time constantly introduce a selected flow of relatively cool liquid into the final pool of cooling liquid in compartment 13, so as to partially compensate for the added heat derived from the warmer containers above said pool.

As an additional cooperative step, the speed of the conveyor 4 can be varied to provide a desirable time factor in each of the variable temperature zones, and particularly in a zone where the time element is a critical feature of the process.

Any desirable number of compartments may be employed, with a group of spraying or showering devices above each compartment, so as to provide for more or less gradual stages of heating and cooling.

In Fig. 1, the desired progressive step by step decreases in temperatures at the pools of intermediate compartments 11 and 12 are very economically obtained without adding any extraneous heating or cooling fluids to said pools.

Under normal operating conditions, when the conveyor is fully loaded with a crowded mass of the containers, the heat transfers from the traveling containers to the sprays and thence to the series of overflowing pools, will occasionally provide the desired progressive temperature changes without adding any extraneous heating or cooling fluids through the inlet conductors 21, 22, 23 and 24. This ideal condition is suggestive of the extreme degree of economy found in the new system.

In actual practice we have found that there are variations in the more or less crowded condition of the mass of containers, and consequent variations in the heat exchange between the groups of sprays and the traveling containers. Under some conditions, there are rather wide open spaces between the traveling containers. As an extreme illustration, the admission of containers may be discontinued or interrupted. Such variations will prevent the above mentioned ideal heat exchanges. However, they will not result in defective treatment of the traveling products.

Our specific conditions provide for an extreme degree of economy under the prolonged normal or average operating conditions, and whenever there is a substantial change in the spacing of containers on the conveyor, the departure from the normal heat exchange can be conveniently compensated for by regulated variations in the admission of extraneous temperature-regulating fluids. Such regulation is preferably automatic, so as to avoid personal attention to conditions at various different temperature zones.

We claim:

1. In an apparatus for selectively varying the temperatures of traveling containers and their contents, so as to perform substantially different processes of cooling, heating and pasteurizing, a conveyor arranged to receive the containers near one end of the apparatus and discharge them near the opposite end, groups of spraying devices above said conveyor to discharge liquids at selected temperatures onto the traveling containers, a series of liquid compartments below the conveyor to receive liquids at different temperatures falling from the containers, liquid conductors leading from the respective compartments to selected groups of said spraying devices, each of said liquid conductors having an inlet at one of said compartments and outlets at a group of the spraying devices directly above the compartment in which its inlet is located, so as to return sprayed liquid to the same compartment, pumps in said liquid conductors to force liquids from pools in said compartments to the groups of devices, adjustable temperature-regulating devices to provide successive zones of different temperatures at the pools of liquids and groups of spraying devices, a regulated cooling temperature being maintained in a pool near the discharge end of said conveyor while a relatively high temperature is maintained in a pool near the intake end of said conveyor, an overflow conductor leading from a liquid compartment near the intake end of said conveyor to discharge excess liquid from the system, said liquid compartments being provided with overflow passages allowing liquid to overflow from one pool to another and thence to said overflow conductor in a direction opposite to the travel of said conveyor, a regulating valve arranged to control the flow through one of said overflow passages and thereby restrict or prevent overflow from one of said compartments to the next adjacent compartment, the compartment from which said overflow is controlled being provided with a separate overflow conductor to discharge liquid from the system, and a regulating valve in said separate overflow conductor movable to restrict or prevent discharge of liquid therethrough, the several regulating devices being independently adjustable to merely provide for progressive gradual cooling of the traveling containers and their contents, or to maintain them at selected high temperatures for a prolonged stage of travel on the conveyor and then gradually cool the traveling products, or to gradually preheat, then pasteurize for a selected period and thereafter gradually cool the traveling products.

2. In an apparatus for selectively varying the temperatures of traveling containers and their contents, so as to perform substantially different processes of cooling, heating and pasteurizing, a conveyor arranged to receive the containers near one end of the apparatus and discharge them near the opposite end, groups of spraying devices above said conveyor to discharge liquids at selected temperatures onto the traveling containers, a series of liquid compartments below the conveyor to receive liquids at different temperatures falling from the containers, liquid conductors leading from the respective compartments to selected groups of said spraying devices, each of said liquid conductors having an inlet at one of said compartments and outlets at a group of the spraying devices, pumps in said liquid conductors to force liquids from pools in said compartments to the groups of spraying devices, means for introducing temperature-regulating fluids into said compartments so as to provide a desired liquid temperature in each of said pools, said means including separate inlet conductors for the admission of said temperature-regulating fluids to the respective compartments, regulating valves controlling the admission of fluids through said inlet conductors, said regulating valves being set to provide successive zones of different temperatures at the pools of liquids and groups of spraying devices, a regulated cooling fluid being introduced through an inlet conductor near the discharge end of said conveyor while a relatively hot fluid is admitted through an inlet conductor near the intake end of said conveyor, an overflow conductor leading from a liquid compartment near the intake end of said conveyor to discharge excess heated liquid from the system, said liquid compartments being provided with overflow passages allowing liquid to overflow from one pool to another and thence to said overflow conductor in a direction opposite to the travel of said conveyor, a regulating valve arranged to control the flow through one of said overflow passages and thereby restrict or prevent overflow from one of said compartments to the next adjacent compartment, the compartment from which said overflow is controlled being provided with a separate overflow conductor to discharge liquid from the system, and a manually controlled regulating valve at said separate overflow conductor movable to restrict or prevent discharge of liquid therethrough, the several regulating valves being adjustable to merely provide for progressive gradual cooling of the traveling products in a process limited to such gradual cooling, or to maintain the incoming products at selected high temperatures for a prolonged stage of travel on the conveyor and then gradually cool the traveling products to a selected low temperature condition in a substantially different process, or to gradually preheat, then pasteurize for a selected period and thereafter gradually cool the traveling products in a still different process.

3. In an apparatus for selectively varying the temperatures of traveling containers and their contents, so as to perform substantially different processes of cooling, heating and pasteurizing, a conveyor arranged to receive the containers near one end of the apparatus and discharge them near the opposite end, groups of spraying devices above said conveyor to discharge liquids at selected temperatures onto the traveling containers, a series of liquid compartments below the conveyor to receive liquids at different temperatures falling from the containers, liquid conductors leading from the respective compartments to selected groups of said spraying devices, each of said liquid conductors having an inlet at one of said compartments and outlets at a group of the spraying devices directly above the compartment in which its inlet is located, so as to return sprayed liquid to the same compartment, pumps in said liquid conductors to force liquids from pools in said compartments to the groups of devices, means for introducing temperature-regulating fluids into said compartments so as to provide a desired liquid temperature in each of said pools, said means including separate inlet conductors for the admission of said temperature-regulating fluids to the respective compartments, variable thermostatic valves controlling the admission of fluids through said inlet conductors, each of said variable thermostatic valves being equipped with a temperature-responsive controlling member exposed to the temperature of the pool of liquid associated with its inlet conductor, said thermostatic valves being set to provide successive zones of different temperatures at the pools of liquids and groups of spraying devices, a regulated cooling fluid being introduced through an inlet conductor near the discharge end of said conveyor while a relatively hot fluid is admitted through an inlet conductor near the intake end of said conveyor, and an overflow conductor leading from a liquid compartment near the intake end of said conveyor to discharge excess liquid from the system, said liquid compartments being provided with overflow passages allowing liquid to overflow from one pool to another and thence to said overflow conductor in a direction opposite to the travel of said conveyor, and the several thermostatic valves being adjustable to merely provide for progressive gradual cooling of the traveling containers and their contents, or to maintain them at selected high temperatures for a prolonged stage of travel on the conveyor and then gradually cool the containers, or to gradually preheat, then pasteurize for a selected period and thereafter gradually cool the traveling products.

4. In an apparatus for selectively varying the temperatures of traveling containers and their contents, so as to perform substantially different processes of cooling, heating and pasteurizing, a conveyor arranged to receive the containers near one end of the apparatus and discharge them near the opposite end, groups of spraying devices above said conveyor to discharge liquids at selected temperatures onto the traveling containers, a series of liquid compartments below the conveyor to receive liquids at different temperatures falling from the containers, liquid conductors leading from the respective compartments to selected groups of said spraying devices, each of said liquid conductors having an inlet at one of said compartments and outlets at a group of the spraying devices directly above the compartment in which its inlet is located, so as to return sprayed liquid to the same compartment, pumps in said liquid conductors to force liquids from pools in said compartments to the groups of spraying devices, means for introducing temperature-regulating fluids into said compartments so as to provide a desired liquid temperature in each of said pools, said means including separate inlet conductors for the admission of said temperature-regulating fluids to the respective compartments, variable thermostatic valves controlling the admission of fluids through said inlet conductors, each of said variable thermostatic valves being equipped with a temperature-responsive controlling member exposed to the temperature of the pool of liquid associated with its inlet conductor, said thermostatic valves being set to provide successive zones of different temperatures at the pools of liquids and groups of spraying devices, a regulated cooling fluid being introduced through an inlet conductor near the discharge end of said conveyor while a relatively hot fluid is admitted through an inlet conductor near the intake end of said conveyor, one of said inlet conductors being equipped with a manually-controlled valve movable to prevent delivery of heating fluid through its thermostatic valve, while the flow through other inlet conductors is regulated by their thermostatic valves, an overflow conductor leading from a liquid compartment near the intake end of said conveyor to discharge excess liquid from the system, said liquid compartments being provided with overflow passages allowing liquid to overflow from one pool to another and thence to said overflow conductor in a direction opposite to the travel of said conveyor, a manually controlled valve arranged to control the flow through one of said overflow passages and thereby restrict or prevent overflow from one of said compartments to the next adjacent compartment, the compartment from which said overflow is controlled being provided with a separate overflow conductor to discharge liquid from the system, and a manually controlled valve at said separate overflow conductor movable to restrict or prevent discharge of liquid therethrough, the several thermostatic valves and manually controlled valves being adjustable to merely provide for progressive gradual cooling of the traveling containers and their contents in a process limited to such gradual cooling of the containers, or to maintain them at selected high temperatures for a prolonged stage of travel on the conveyor and then gradually cool the containers in a substantially different process, or to gradually preheat, then pasteurize for a selected period and thereafter gradually cool the traveling products.

JAMES L. HEROLD.
WILLIAM J. NEKOLA.
FREDERICK W. WEHMILLER.

REFERENCES CITED

The following references are of record in the file of this patent:

UNITED STATES PATENTS

| Number | Name | Date |
|---|---|---|
| 801,693 | Ruff | Oct. 10, 1905 |
| 1,127,634 | Kerber | Feb. 9, 1915 |
| 2,203,141 | Gruetter | June 4, 1940 |
| 2,262,030 | Meyer | Nov. 11, 1941 |
| 2,282,187 | Herold et al. | May 5, 1942 |